(12) United States Patent
Livingston

(10) Patent No.: US 7,354,304 B2
(45) Date of Patent: Apr. 8, 2008

(54) RETRACTABLE CORD ASSEMBLY FOR SECURING PORTABLE ELECTRONIC DEVICES

(76) Inventor: Charles R. Livingston, 123 Commonwealth Avenue, Boston, MA (US) 02116

( * ) Notice: Subject to any disclaimer, the term of this patent is extended or adjusted under 35 U.S.C. 154(b) by 0 days.

(21) Appl. No.: 11/369,115

(22) Filed: Mar. 7, 2006

(65) Prior Publication Data

US 2007/0212931 A1    Sep. 13, 2007

(51) Int. Cl.
*H01R 13/52* (2006.01)
(52) U.S. Cl. ..................................... 439/501
(58) Field of Classification Search ............... 439/501, 439/162; 242/376, 379, 379.2; 250/483.1; 191/12.4
See application file for complete search history.

(56) References Cited

U.S. PATENT DOCUMENTS

| | | | | |
|---|---|---|---|---|
| 5,674,437 A | * | 10/1997 | Geisel | 264/21 |
| 6,082,656 A | | 7/2000 | Thornton | 242/385.4 |
| 6,290,158 B1 | * | 9/2001 | Huang | 242/379 |
| 6,578,683 B1 | | 6/2003 | Burke et al. | 191/12.4 |
| 6,731,956 B2 | | 5/2004 | Hanna et al. | 455/569.1 |
| 2004/0188557 A1 | * | 9/2004 | Raia et al. | 242/379 |

* cited by examiner

*Primary Examiner*—Alexander Gilman
(74) *Attorney, Agent, or Firm*—Burns & Levinson LLP; Stephen Y. Chow

(57) ABSTRACT

A retractable cord assembly adapted to secure to a portable electronic device to a clippable housing to prevent damage during accidental misuse.

11 Claims, 3 Drawing Sheets

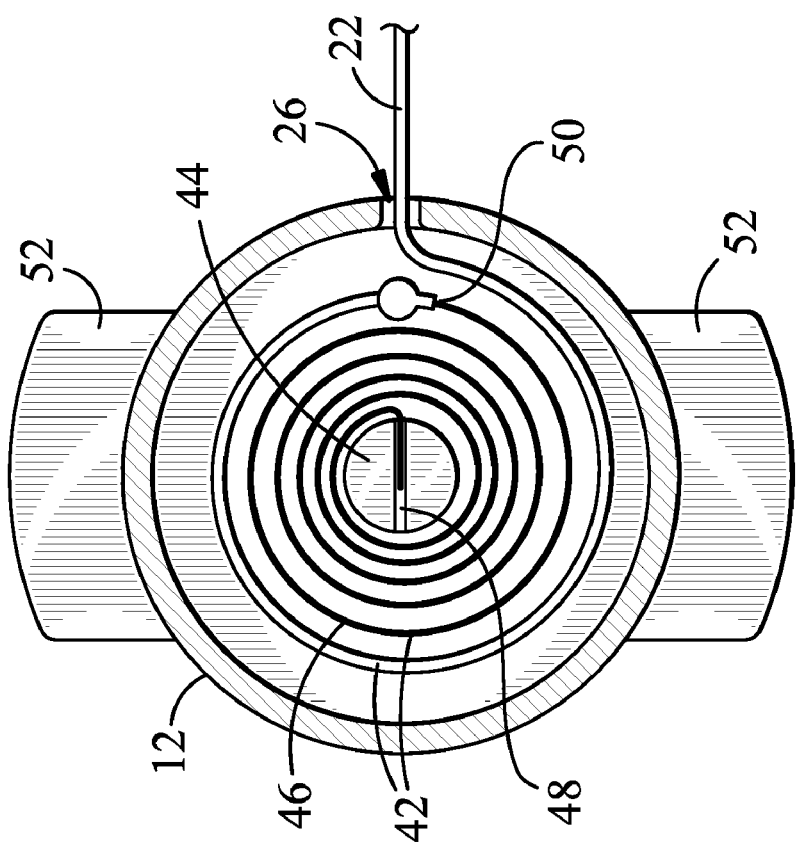
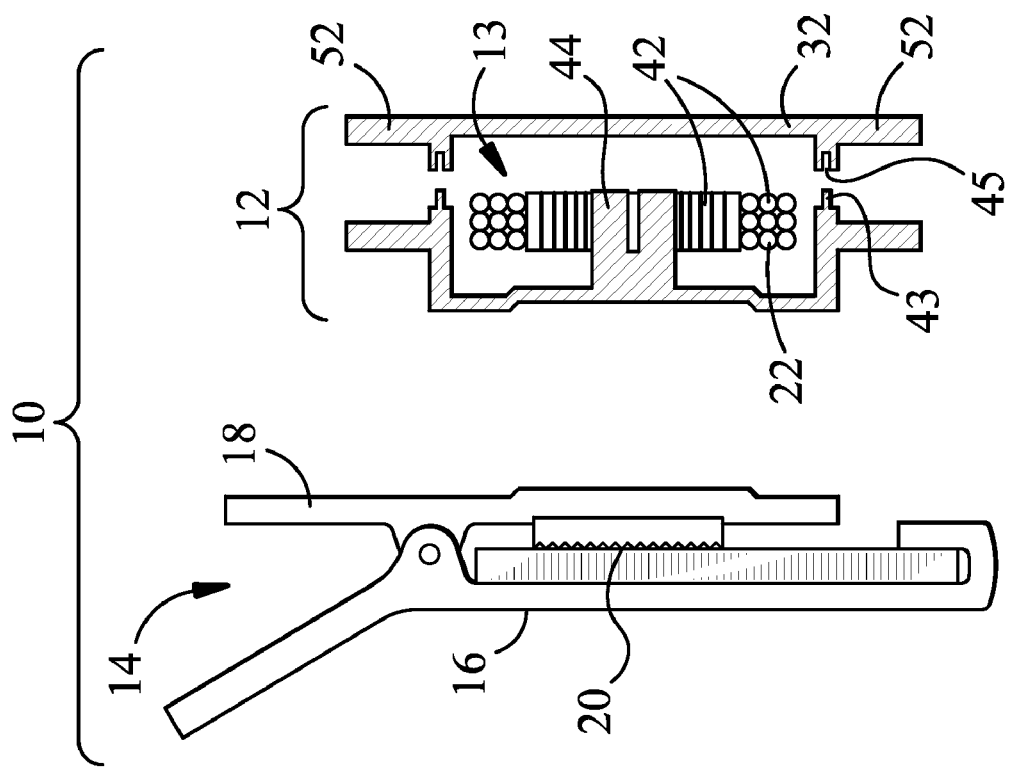
FIG. 3
FIG. 2

RETRACTABLE CORD ASSEMBLY FOR SECURING PORTABLE ELECTRONIC DEVICES

FIELD OF THE INVENTION

This invention relates generally to the secure transport of portable electronic devices, such as cell phones, and more particularly to a rectractable cord assembly capable of securing a portable electronic device.

BACKGROUND OF THE INVENTION

The popularity of cell phones and portable electronic devices has increased greatly in the past few years. Although many of these devices were large and relatively bulky when first introduced, the size of these devices have been reduced dramatically as technology has provided for the miniaturization of circuitry and power sources. For example, certain cell phones have dimensions as small as 3.4"×1.8"×1.1" and weigh less than 4 ounces. Due to the convenience and small size, cell phones and other such devices are regularly carried by users in purses, pockets, briefcases, and belt holsters. Other small portable electronic devices, such as paging devices, personal organizers, and remote controls for garage doors and the like are also carried by consumers during their day-to-day activities.

Their small size and light weight make them relatively easy to drop, leading to loss or damage of the device. In the case of cell phones or personal organizers, the user's personal information stored on these devices may also be lost or damaged, causing great inconvenience to the user, who must then reprogram the device. In addition, some of the application programming may be affected or rendered unusable. Currently, holsters or clips are used to secure such portable electronics to backpacks and/or belts. However, once removed from the holster or clip, the electronic device may still be dropped or damaged. Thus, it would be useful if the electronic devices described above could be secured to a belt, backpack, or other support, in such a manner that the device would be unlikely to fall to the ground if dropped.

SUMMARY OF THE INVENTION

The present invention provides a novel retractable cord assembly for securing a portable electronic device (e.g., a cell phone or personal digital assistant) to a static element such as, for example, a belt, backpack, or lanyard, and for preventing the device from being dropped and possibly damaged.

The retractable cord assembly includes a housing from which a length of flexible cord of sufficient strength to withstand the forces encountered when retracting a portable electronic device is drawn or extended. The cord is preferably inelastic, and may exhibit photoluminescent properties. A clip connected to the housing, being either integrally formed with or later affixed to the housing, permits reversible connection of the housing to a static element (e.g, a belt.) In a preferred embodiment, the clip is preferably a clothespin-style clip. The cord has two ends, the first of which is connected to and wound about a spring-loaded spool assembly rotatably mounted in the housing. In a wound position, nearly the entire length of cord is wound about the spool assembly, retracting the second end of the cord to a position proximate but outside of the housing. In its drawn or extended position, extension of the cord is resisted by a retracting force provided by a torsion spring in the spring-loaded spool assembly sufficient to retract the cord, with the electronic device attached at the second end of the cord, back to the wound position if no extending force (other than gravity) is applied. The retractable cord assembly further includes a locking mechanism including a first interlocking part affixed to the housing and a second interlocking part that is securable to the portable electronic device. In certain embodiments, the second locking part is directly, permanently secured (e.g., by adhesive or other means) to the electronic device, while in others the second locking part may be integrated with a strap, pouch or other device holding means. In the former embodiments, the second interlocking part is preferably thin enough so as not to interfere with the user's comfort in holding the device, or with placement of the device in holsters or other protective holders. The interlocking parts mateably, reversibly join such that the portable electronic device can be secured to the housing. The second end of the cord is secured to the second interlocking part of the locking mechanism, which permits rapid retraction of the electronic device to a position proximate the housing if the device is dropped by the user.

In certain embodiments the second end of the cord is tied to the second interlocking component, while in others a clasp mechanism secures the cord to the second interlocking component. The two interlocking parts are capable of being secured together or separated by rotating the parts relative to one another to locked or unlocked positions, respectively. In a preferred embodiment, either the first interlocking part or the second interlocking part includes at least one flange, and the other includes at least one corresponding groove to rotatably receive the at least one flange. Thus, the electronic device may be secured to the housing or separated from the housing while still being attached to the retractable cord, preventing its loss or damage.

Several embodiments of the housing are described below, however those of skill in the art will appreciate that many other shapes may be utilized than these. In a preferred embodiment, the spring-loaded spool assembly is enclosed within a housing that has an opening through which the cord may be extended or retracted.

BRIEF DESCRIPTION OF THE FIGURES

For a better understanding of the present invention, reference is made to the accompanying detailed description and figures, wherein:

FIG. 2 is a exploded, cross-sectional side view of a housing in accordance with an embodiment of the present invention;

FIG. 3 is a cross-sectional front view of a housing in accordance with an embodiment of the present invention.

DETAILED DESCRIPTION OF PREFERRED EMBODIMENTS OF THE INVENTION

Figure 1:
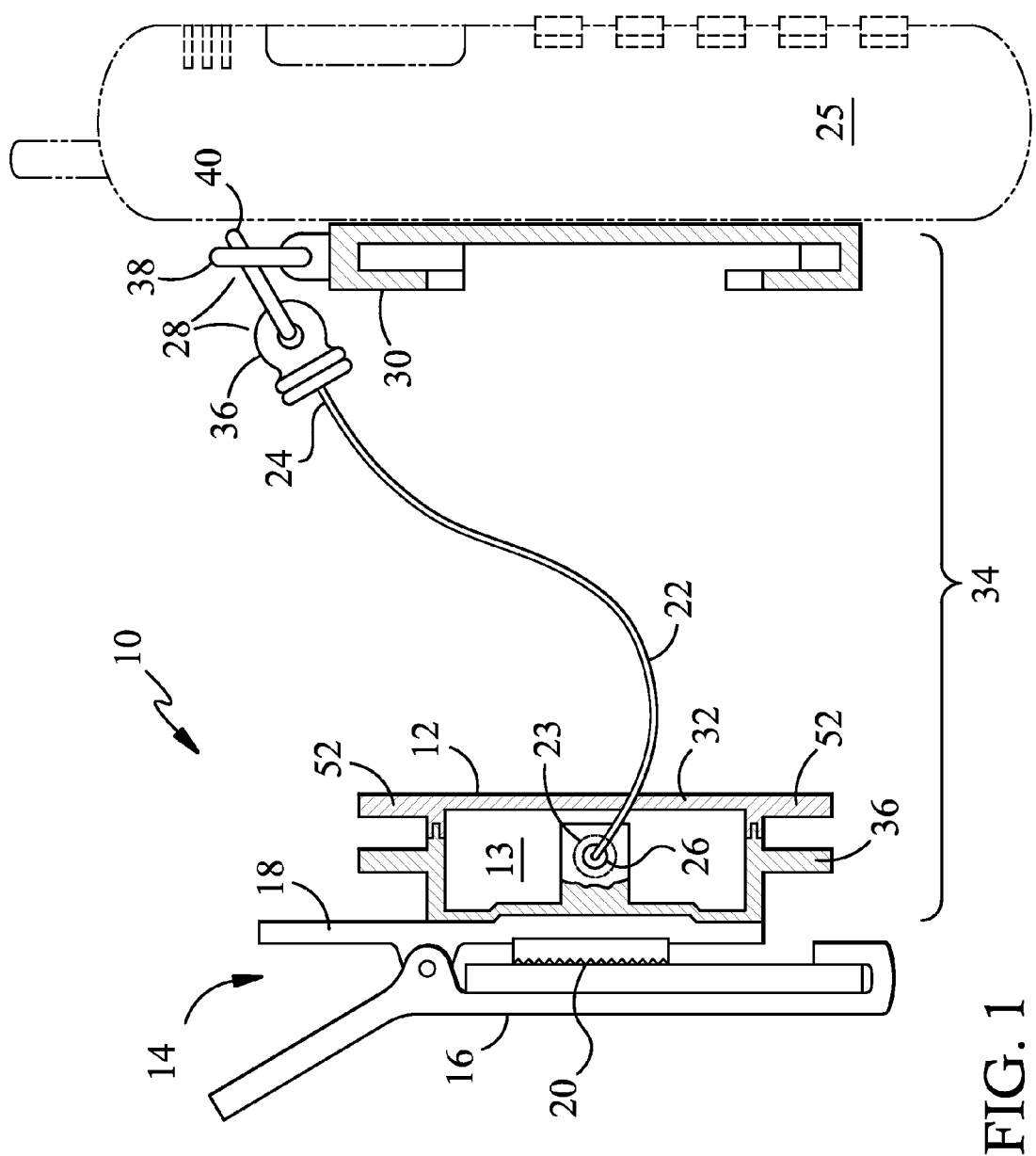
FIG. 1 is an illustration of one embodiment of a retractable cord assembly in accordance with the present invention.

Referring now to FIG. 1, a retractable cord assembly produced in accordance with the present invention is shown and indicated generally by the numeral 10. The retractable cord assembly 10 includes a housing 12, to which a clip 14 is connected to permit the housing 10 to be secured to a static element, such as a backpack or belt. Clip 14 is shown to be of a clothespin style, wherein two pivotable arms 16,18 are spring-biased so as to urge engagement, possibly at a region including interlocking teeth 20 for gripping the static element to which the housing is to be clipped. The housing and clip are preferably composed of a durable, molded plastic or a metal material.

For any of the embodiments described, housing 12 for the unit can have any external shape. A cylindrical exterior is shown enclosing an internal chamber 13 for illustrative purposes and to show symmetry with other features described below. The shape could also depend upon, for example, the shape or configuration of the mobile phone or other wireless device for its intended use. In particular, the housing can be made of various shapes in order to match various types of mobile phones or other portable electronics.

Retractable cord assembly 10 further includes a length (typically 2-3 feet) of cord 22 having a first end 23 and a second end 24. The cord is composed of a flexible, inelastic material capable of supporting the weight of portable electronic device 25 even when the device 25 is dropped by the user and during cord retraction. For exemplary purposes, a nylon fishing line type cord (20 pound test) would be suitable for use. Cord 22 is shown in a partially extended state such as might exist, for example, when a user is utilizing the portable device 25. The cord extends out from housing 12 through opening 26 therein, with the first end 23 of the cord disposed in the internal chamber 13 of housing 12, and the second end 24 disposed outside of the housing. Cord 22 may also be composed at least in part of a photoluminescent material.

Connected to the second end 24 of the cord 22 is an optional clasp mechanism 28 (such as a jewelry clasp) which is configured to secure and/or detach the second end of the cord to or from a second part 30 of two interlocking parts 30, 32 comprising a lock mechanism 34. In one embodiment, the clasp mechanism is comprised of knob 36 preventing the second end 24 of the cord from being retracted completely back through opening 26 in housing 12 and either a ring or snap hook 40 for engaging a corresponding ring 38 (or other feature having an aperture) or snap hook of the second interlocking part 30. Alternatively, the cord 22 could be tied to the ring 38 or another feature of the second interlocking part 30. The second interlocking part 30 is intended to be permanently affixed to the electronic device 25 (shown as a cell phone), which may be achieved by adhesive or other means. Interlocking part 30 is designed preferably to be very thin (e.g., on the order of 1/16 to 2/16" thick) so as not to interfere with use of conventional holsters or other portable device transport means once permanently affixed to the cell phone. Lock mechanism 34 will be described in greater detail below, but in general permits the portable device 25 to be securely fastened to the housing 12 through rotatable connection of interlocking parts 30 and 32.

With reference to the exploded, cross-sectional side view of housing 12 shown in FIG. 2, it can be seen that cord 22 in its wound state is wound about a spring loaded spool assembly 42 disposed within chamber 13. Housing 22 is shown as comprised of two components with mateable features 43,45, however those of skill in the art will appreciate many alternative approaches to forming a housing for containing moving parts. The cross-sectional front view of housing 12 shown in FIG. 3 illustrates that cord 22 exits housing 12 at opening 26. In the embodiment shown, spring loaded spool assembly 42 is comprised of a cylindrical support structure 44 fixed to the housing 12 and disposed generally in the center of the housing. Cord 22 is connected to a clock or torsion spring 46 affixed to a slot 48 in the cylindrical support structure 44 at one end and to cord 22 at its other end 50. The cylindrical support 44 serves as the main axle for the spring 46, which is fully constrained by the cord 22 and housing chamber wall 52. As the cord 22 is extended from housing 22, spring 46 tightens and biases cord 22 with a force that opposes extension (or unwinding) of cord 22 from housing 12 with a force sufficient to retract cord 22 to the wound position even if cord 22 is connected to the cell phone (via a clasp mechanism or direct tying) and, further, even if the cell phone is dropped by the user.

Figure 4:
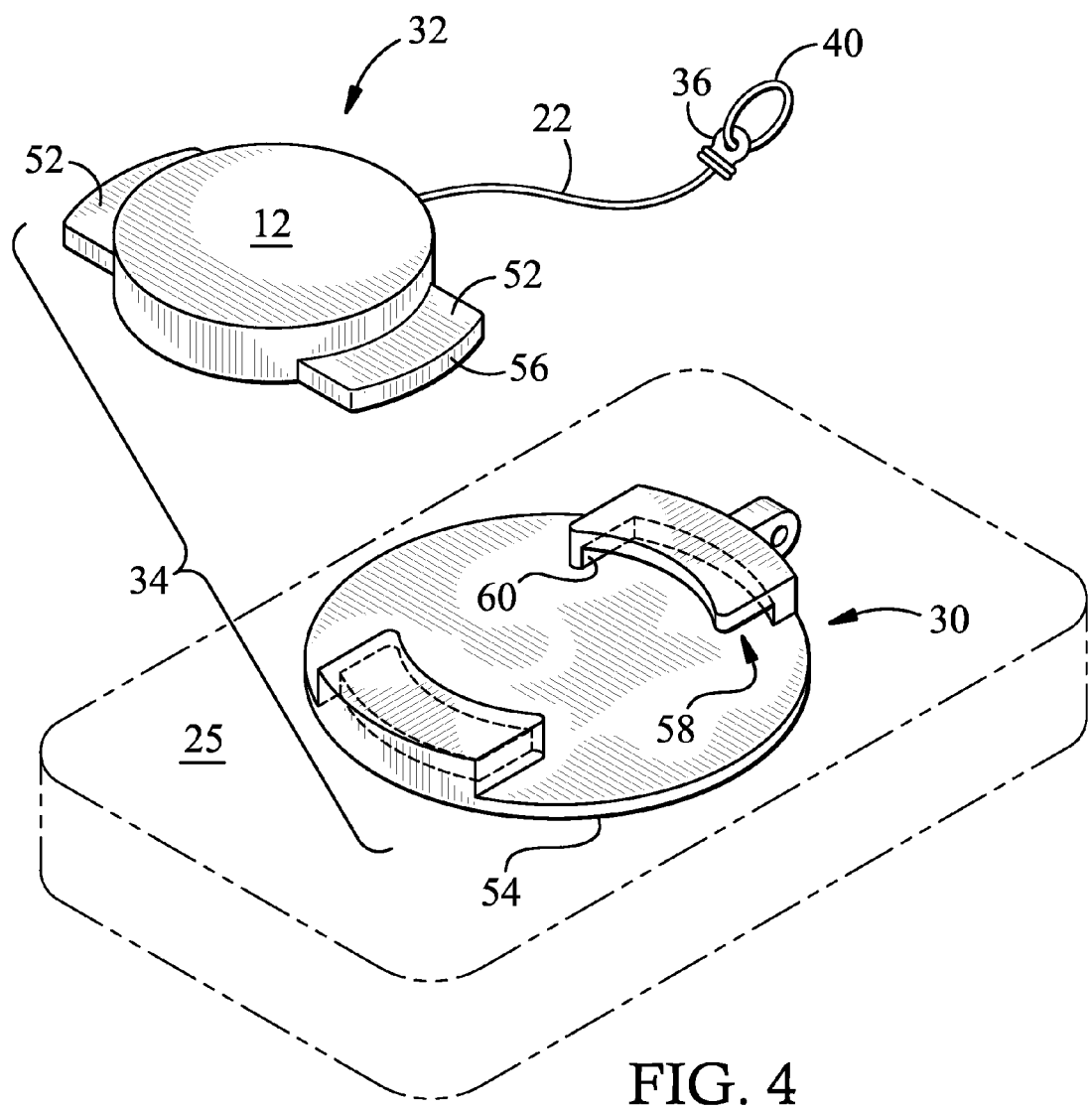
FIG. 4 is an illustration of functional components of a locking mechanism in accordance with an embodiment of the invention.

FIG. 4 illustrates the interlocking parts 30, 32 of lock mechanism 34, omitting the clip on housing 12 in order to simplify understanding. In the embodiment shown, first interlocking part 32 is comprised of at least one flange 52 affixed to housing 12 and projecting outwardly from the housing in spaced relation to one another. (An embodiment slightly different from the one shown in FIG. 4 can be seen in FIG. 1, where a gap 36 is created between flange 52 and parts of housing 12.) Flange(s) 52 may be permanently adhered to housing 12 after forming the housing, or may be integrally formed with the housing as, for example, a molded part. Second interlocking part 30 is securable to the cell phone 25 by means of adhesive applied on either or both surfaces of said elements. Such an adhesive may be added by the consumer, or alternatively be previously applied to the surface 54 of the second interlocking part 30 with a peel-away foil (not shown) that exposes the adhesive when the user is ready to secure the second interlocking part to the cell phone 25. In yet another embodiment (not shown), the second interlocking part 30 may alternatively be secured to a strap or pouch adapted to receive the portable electronic device, rather than directly adhered to the device.

In a preferred embodiment, the flange of flanges 52 of the first interlocking part 32 includes an arcuate edge 56, while the second interlocking part 30 includes at least one corresponding arcuate groove 58 adapted to rotatably receive the flange(s). When the first interlocking part 32 is positioned adjacent the second interlocking part 30 and rotated by some predetermined angle (e.g., 90° counterclockwise), parts 30 and 32 become (reversibly) locked, thereby securing the cell phone 25 to the housing 12. Conversely, in order to unlock parts 30 and 32, the parts my be rotated in the opposite direction (e.g., clockwise) by the same amount. Additionally, lock mechanism 34 may include a means for preventing rotating the locking parts too much, such as stop wall 60. Stop wall 60 limits the extent to which the flange 52 may be rotated within groove 58, halting further rotation when flange 52 encounters stop wall 60.

While the invention has been described in connection with the preferred embodiments described above, it is not intended to limit the scope of the invention to the particular form set forth, but on the contrary, it is intended to cover such alternatives, modifications, and equivalents as may be included within the spirit and scope of the invention as defined by the appended claims.

It is claimed:

1. A retractable cord assembly for portable electronic devices, comprising:

a housing;

a clip connected to the housing, the clip configured to secure the housing to a static element;

a length of cord having a first end and a second end, the cord capable of supporting and retracting a portable electronic device, the second end of the cord disposed outside of the housing;

a spring loaded spool assembly rotatably disposed in the housing, to which the cord is connected at the first end, and about which the cord is substantially wound when in a wound position, the spring loaded spool assembly providing a force resisting extension of the cord sufficient to retract the cord when secured to the portable electronic device;

a lock mechanism comprising a first interlocking part affixed to the housing and a second interlocking part securable to the portable electronic device and to the second end of the cord, said lock mechanism in its locked configuration rotatably fastening said second interlocking part to said first interlocking part.

2. The assembly of claim 1, wherein the housing includes an opening through which the cord may be unwound from the spool to an extended position.

3. The assembly of claim 1, wherein the first interlocking part is permanently affixed to the housing.

4. The assembly of claim 1, wherein the first interlocking part is an integral feature of a housing assembly.

5. The assembly of claim 1, wherein the clip is a clothespin style clip.

6. The assembly of claim 1, wherein:
either of the first interlocking part or the second interlocking part includes at least one flange; and
the other of the first interlocking part or the second interlocking part includes
at least one corresponding groove to rotatable receive the at least one flange.

7. The assembly of claim 1, wherein the cord is composed of a flexible, inelastic material.

8. The assembly of claim 1, wherein the cord is composed at least in part of a photoluminescent material.

9. The assembly of claim 1, further comprising a strap or pouch integrating the second interlocking part and adapted to receive the portable electronic device.

10. The retractable cord assembly of claim 1, further comprising a clasp mechanism securing the second end of the cord to the second interlocking part of the lock mechanism.

11. The assembly of claim 10, wherein the clasp comprises a snap hook.

* * * * *